United States Patent [19]

Campbell

[11] 3,936,426

[45] Feb. 3, 1976

[54] AMORPHOUS, OPTICALLY CLEAR POLYAMIDE FROM A BIS(4-AMINOCYCLOHEXYL)METHANE AND A PHENYLINDAN DICARBOXYLIC ACID

[75] Inventor: Robert W. Campbell, Bartlesville, Okla.

[73] Assignee: Phillips Petroleum Company, Bartlesville, Okla.

[22] Filed: July 25, 1974

[21] Appl. No.: 491,834

Related U.S. Application Data

[63] Continuation-in-part of Ser. No. 210,598, Dec. 21, 1971, Pat. No. 3,838,111.

[52] U.S. Cl. ............................. 260/78 R; 428/474
[51] Int. Cl.² ...................................... C08G 69/26
[58] Field of Search ............................ 260/78 R

[56] References Cited

UNITED STATES PATENTS

| | | | |
|---|---|---|---|
| 3,383,368 | 5/1968 | Ridgway | 260/78 R |
| 3,393,210 | 7/1968 | Speck | 260/78 R |
| 3,416,302 | 12/1968 | Knospe | 260/78 R |
| 3,703,595 | 11/1972 | Falkenstein et al. | 260/78 R |

*Primary Examiner*—Harold D. Anderson

[57] ABSTRACT

Substantially amorphous, optically clear polyamides are produced from a bis(4-aminocyclohexyl)methane or methyl derivative thereof and a phenylindanedicarboxylic acid or alkyl derivative thereof. Copolyamides having desirable processing properties are produced by polymerizing the above monomers and at least one straight chain dicarboxylic acid as an additional monomer. The resulting polymers are useful as fibers, molding resins, coatings, adhesives, and the like.

6 Claims, No Drawings

AMORPHOUS, OPTICALLY CLEAR POLYAMIDE FROM A BIS(4-AMINOCYCLOHEXYL)METHANE AND A PHENYLINDAN DICARBOXYLIC ACID

This is a continuation-in-part application of my co-pending application having Ser. No. 210,598, filed Dec. 21, 1971, now U.S. Pat. No. 3,838,111.

This invention relates to the production of polyamides. In accordance with another aspect, this invention relates to the production of amorphous, optically clear polyamides from bis(4-aminocyclohexyl)methane compounds and phenylindanedicarboxylic acids. In accordance with a further aspect, this invention relates to copolyamides formed from bis(4-aminocyclohexyl)methane compounds, phenylindanedicarboxylic acids, and straight chain dicarboxylic acids. In accordance with still another aspect, this invention relates to polyamides and copolyamides as defined above which are useful as fibers, molding resins, coatings, adhesives, and the like. In accordance with a further aspect, this invention relates to polyamides or copolyamides that are filled which exhibit excellent properties and are useful as molding resins, coating, etc. In accordance with another aspect, this invention relates to coated bases, especially metal bases, wherein the coating is derived from an amorphous, optically clear polyamide produced from a bis(4-aminocyclohexyl)methane and a phenylindanedicarboxylic acid.

Various polyamides formed from the condensation reaction of bis(4-aminocyclohexyl)methane, herein referred to as PACM, or methyl derivatives thereof and various dicarboxylic acids are known. Such materials are often employed as synthetic fibers, as well as being formed into other molded articles. It has now been found that there can be produced a polyamide of PACM or methyl derivative thereof and a phenylindanedicarboxylic acid and, optionally, with a straight chain dicarboxylic acid as an additional monomer, which evidences unusual properties in respect to making a polyamide suitable for molding, especially if the polyamide is produced from PACM or methyl derivative thereof in which at least 40 percent of the PACM or methyl derivative thereof is of the trans,trans configuration.

Adhesive compositions comprising various synthetic polymeric materials are old in the art. Additionally, the known adhesives have been used fairly extensively for adhering one metal substrate to another metal substrate or to some other type of substrate such as wood, glass, leather, plastic, and so forth. Some of the known compositions provide reasonably good bond strengths at room temperature and thus are satisfactory for some purposes. However, most known prior art compositions do not retain satisfactory bond strengths when the adhered substrates are subjected to elevated temperatures, especially when subjected to elevated temperatures in a moisture-laden atmosphere or when directly contacted with hot or boiling water.

One of the more significant developments in adhesive technology in recent years has occurred in the area of hot melt adhesives. Growth in the use of hot melt systems has been particularly marked by various segments of the packaging, bookbinding and shoe industries, as well as certain specialized areas of metal-to-metal bonding. Increased interest in hot melts has in turn encouraged developments of special types of thermoplastic resins to serve as base constituents in commercial formulations.

Accordingly, an object of this invention is to provide novel polyamides having desirable molding characteristics.

Another object of this invention is to provide coating compositions which are characterized by their ability to adhere to a wide variety of substrates or bases.

Still another object of this invention is to provide novel copolyamides suitable for molding.

A further object of this invention is to provide polyamides that can be filled with suitable filler materials yielding products suitable for molding.

Other objects and aspects, as well as the several advantages of the invention, will be apparent to those skilled in the art upon reading the specification and the appended claims.

In accordance with this invention, substantially amorphous, optically clear polyamides are produced by the polymerization of bis(4-aminocyclohexyl)methane or methyl derivatives thereof with a phenylindanedicarboxylic acid or alkyl derivative thereof.

Further in accordance with the invention, copolyamides are produced from bis(4-aminocyclohexyl)methane or methyl derivatives and phenylindanedicarboxylic acids or alkyl derivatives thereof with straight chain dicarboxylic acids.

More specifically in accordance with the invention, compositions useful as coatings and adhesives are provided, which compositions comprise substantially amorphous polyamides prepared by polymerizing at least one bis(4-aminocyclohexyl)methane with at least one phenylindanedicarboxylic acid. The polymeric compositions of the invention are thermally stable at polymer melt temperatures.

In accordance with a specific embodiment, a copolyamide possessing outstanding mechanical properties is produced from PACM and a mixture of dicarboxylic acids in which 75 percent of the acid is a straight chain dicarboxylic acid such as suberic acid and the remainder is a phenylindanedicarboxylic acid, specifically 1,1,3-trimethyl-5-carboxy-3-(p-carboxyphenyl)indane (PIDA)

The bis(4-aminocyclohexyl)methane or methyl derivative thereof for use in this invention can be represented by the formula

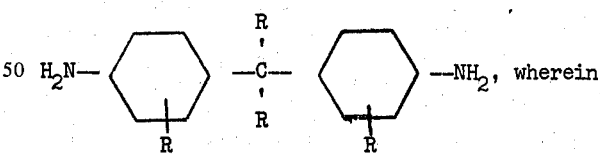, wherein each R is selected from hydrogen and methyl radicals. Mixtures of these diamines can be employed. Although any of the geometric isomers or mixtures thereof can be employed, it is preferred that at least 40 percent be of the trans-trans configuration. Ordinarily, the amount of trans-trans isomer present does not exceed about 70 percent. Specific compounds that have been polymerized include bis(4-aminocyclohexyl)methane (PACM) or its methyl derivatives, e.g., 2,2-bis(4-aminocyclohexyl)propane (PACP).

The phenylindanedicarboxylic acid or alkyl derivative thereof applicable in this invention can be represented by the formula

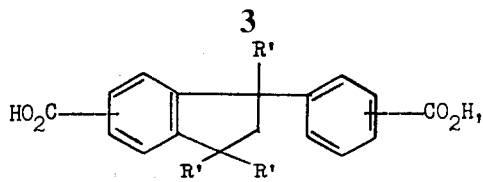

wherein each R' is selected from hydrogen and alkyl radicals having 1–3 carbon atoms. Mixtures of compounds represented by this formula can be employed. The compound of the above structure presently preferred for use in this invention is 1,1,3-trimethyl-5-carboxy-3-(p-carboxyphenyl)indane.

The straight chain dicarboxylic acid which optionally but preferably is used as a comonomer in the production of the polyamides of this invention can be represented by the formula $HO_2C(CH_2)_xCO_2H$, wherein $x$ is an integer of 4–16, preferably 5–10, these preferred values of 5–10 representing average values of $x$ when mixtures of straight chain dicarboxylic acids are employed.

The straight chain dicarboxylic acids containing 6 to 18 carbon atoms include adipic acid, pimelic acid, suberic acid, azelaic acid, sebacic acid, undecanedioic acid, pentadecanedioic acid, dodecanedioic acid, tridecanedioic acid, tetradecanedioic acid, heptadecanedioic acid, octadecanedioic acid, and hexadecanedioic acid, and their mixtures.

In the polymerization process, the molar ratio of the dicarboxylic acid(s) to the diamine(s) should be substantially 1:1, although a slight excess, e.g., up to about 5 mole percent, of acid or amine can be used. When a straight chain dicarboxylic acid or mixture of such straight chain acids is employed, the straight chain dicarboxylic acid(s) can constitute up to 85 mole percent, generally 15–85 mole percent, of all the dicarboxylic acids used, preferably constituting 50–80 mole percent of the total amount of dicarboxylic acids employed.

Use of the straight chain dicarboxylic acids as herein preferred gives amorphous, optically clear polyamides which can be molded into objects having a particularly desirable balance of properties, e.g., a high degree of stiffness, excellent property retention at elevated temperatures, and good hydrolytic stability. A particularly outstanding polyamide is produced by polymerizing bis(4-aminocyclohexyl)methane having a trans-trans isomer content greater than 40 percent with a mixture of 75 mole percent suberic acid and 25 mole percent 1,1,3-trimethyl-5-carboxy-3-(p-carboxyphenyl)indane. Such a polyamide possesses an especially good balance of mechanical properties, property retention under a variety of conditions, and good melt processability. The polyamides and copolyamides are also useful in the production of meltshaped articles including fibers, films, and the like. The polyamides and copolyamides are also useful in the coating of bases, especially metals, or as adhesives in the formation of laminates, especially metal laminates.

The polyamides employed as adhesives in this invention are especially useful as hot melt adhesives which can be employed in conventional manner, e.g., application by an extrusion technique in which the molten polymer is allowed to flow on or between substrates to be bonded, or by application as a powder or preformed film between substrates which are subjected to heating. The polyamides employed as adhesives in this invention also can be used as solvent cements, in which the polymers dissolved in a suitable solvent are applied to substrates in conventional manner, with the bond produced as the solvent evaporates or with solvent evaporation followed by a thermal bondforming operation. If desired, other substances known to have utility in adhesive formulations, e.g., resins such as olefin resins or terpene resins, waxes, plasticizers, fillers, pigments, and the like, can be present in the adhesive compositions. The adhesives can be used to bond a variety of like or unlike substrates, e.g., metals such as aluminum, iron, steel, e.g., carbon steel, zinc, or tin; wood; paper; leather; plastic; and the like.

The polyamides can be prepared by conventional polymerization procedures, e.g., by a melt polymerization process such as that described in U.S. Pat. No. 2,512,606. The polymerization preferably is conducted at a temperature within the range of about 260°–340°C for about 2–6 hours; however, polymerization temperatures and reaction times outside these ranges can be employed. Water can be present to serve as a heat transfer agent and to aid in keeping the reactants in the reaction zone.

The polymers of this invention can be blended with various fillers or additives such as pigments, stabilizers, softeners, extenders, or other polymers. For example, there can be incorporated in the polymers of this invention substances such as graphite, carbon black, titanium dioxide, glass fibers, carbon fibers, metal powders, magnesia, silica, asbestos, wollastonite, clays, wood flour, cotton floc, alpha-cellulose, mica, and the like. A more complete list of fillers is disclosed in *Modern Plastics Encyclopedia*, 41, No. 1a, September 1963, pages 529–536. If desired, such fillers can be added to the polymerization reactor.

EXAMPLE I

In the preparation of each in a series of polyamides, a mixture containing approximately equimolar quantities of diamine and dicarboxylic acid(s) was heated in the presence or absence of water to a final temperature of about 320°C over a period of 2.5 hours under a nitrogen atmosphere. After one hour at this temperature, volatile material was vented, and heating was continued at about 320°C for approximately one hour under a slow nitrogen flush and for an additional hour under vacuum (20–200 mm Hg). Physical properties of each of the resulting polyamides are shown in Table I, and mechanical properties of compression molded samples of the polymers are given in Table II. In each of the tables the polyamide is designated in the following manner. The amine employed is shown on the left of the hyphen. In each instance the amine was either bis(4-aminocyclohexyl)methane, designated as PACM, or 2,2-bis(4-aminocyclohexyl)propane, designated as PACP. A subscript following PACM or PACP represents the percent trans-trans isomer content in the amine used. When no subscript follows PACM, the trans-trans isomer content in the amine was 54 percent. The acid or acids employed are shown on the right of the hyphen. When more than one acid was used, the mole ratio of the acids employed is shown in parentheses following the designation of the acids. In each instance, except for PACM-8 polyamide used as a control polymer outside the scope of this invention, the acid 1,1,3-trimethyl-5-carboxy-3-(p-carboxyphenyl)indane, designated as PIDA, was used. A second or third acid, if used, was adipic acid, suberic acid, azelaic acid, or dodecanedioic acid, designated by the number 6, 8, 9, or 12, respectively. For example, PACM-8/PIDA (75/25) was a polyamide produced by the polymerization of PACM having a trans-trans isomer content of 54 percent with a mixture of suberic acid and PIDA in a mole ratio of 75 to 25, respectively. The control polymer PACM-8 was a polyamide prepared from PACM and suberic acid.

The mechanical properties shown in Table II were determined on compression molded samples.

TABLE I

| Run No. | Polyamide | Inherent Viscosity[a] | Polymer Melt Temperature, °C[b] |
|---|---|---|---|
| 1 | PACM-8/PIDA (85/15) | 0.86 | 240 |
| 2 | PACM-8/PIDA (80/20) | 0.82 | 240 |
| 3 | PACM-8/PIDA (75/25) | 0.78 | 245 |
| 4 | PACM-8/PIDA (70/30) | 0.64 | 250 |
| 5 | PACM-8/PIDA (60/40) | 0.59 | 275 |
| 6 | PACM-8/PIDA (50/50) | 0.68 | 275 |
| 7 | PACM-8/PIDA (25/75( | 0.58 | 300 |
| 8 | $PACM_{(29)}$-8/PIDA (75/25) | 0.66 | 250 |
| 9 | $PACM_{(69)}$-8/PIDA (75/25) | 0.78 | 250 |
| 10 | PACM-9/PIDA (75/25) | 0.90 | 250 |
| 11 | PACM-9/PIDA (70/30) | 0.78 | 265 |
| 12 | PACM-9/PIDA (60/40) | 0.86 | 275 |
| 13 | PACM-12/PIDA (75/25) | 0.94 | 235 |
| 14 | PACM-12/PIDA (70/30) | 0.87 | 235 |
| 15 | PACM-12/PIDA (60/40) | 0.72 | 250 |
| 16 | PACM-6/9/PIDA (40/40/20) | 0.91 | 230 |
| 17 | $PACP_{(64)}$-8/PIDA (75/25) | 0.65 | 260 |
| 18 | PACM-PIDA | 0.33 | 320 |
| 19 | PACM-8 | 1.08 | 270 |

[a] Measured at 30°C on m-cresol solutions having a polyamide concentration of 0.5 g/100 ml solution.
[b] Determined by placing the polymer on a heated bar with a temperature gradient.

tions. A polymer having good properties also was obtained when a mixture of PIDA, adipic acid, and azelaic acid was used in its preparation. The use of PACM having a trans-trans content ranging from 29 percent to 69 percent with PIDA and suberic acid gave polyamides exhibiting good properties, the best properties resulting from the use of PACM having a trans-trans content of 54 percent or 69 percent. Replacement of PACM with PACP as the diamine component in polymerization with PIDA and suberic acid was demonstrated to give a polyamide having good properties. The PACM-8/PIDA polymers all exhibited greater stiffness and greater property retention at elevated temperatures than did the control polymer PACM- 8, as shown by the higher values for flexural modulus and heat deflection temperature. Furthermore, upon heating a 0.5 g sample of finely ground PACM-8 polyamide in refluxing 6 N aqueous hydrochloric acid for 2 hours, the polymer melt temperature of the polymer decreased 110°C and the inherent viscosity was reduced to 16 percent of its value prior to this treatment. Upon like treatment, a 0.5 g sample of finely ground PACM-8/PIDA (75/25) underwent a decrease in polymer melt temperature of only 10°C and 47 percent of the initial inherent viscosity was retained. Thus, the hydrolytic stability of PACM-8/PIDA (75/25) was much greater than that of PACM-8.

EXAMPLE II

Filled PACM-8/PIDA (75/25) polyamide specimens,

TABLE II

| Polyamide | Tensile Strength, psi × $10^{-3}$(a) | Elongation, % (a) | Flexural Modulus, psi × $10^{-5}$(b) | Izod Impact Strength, ft.-lb./in.notch (c) | Heat Deflection Temperature, 264 psi, °F (d) |
|---|---|---|---|---|---|
| PACM-8/PIDA (85/15) | — | — | — | Tough | — |
| PACM-8/PIDA (80/20) | 11.1 | 41 | 2.8 | 1.8 | 321 |
| PACM-8/PIDA (75/25) | 11.0 | 39 | 2.8 | 1.6 | 323 |
| PACM-8/PIDA (70/30) | 8.4 | 10 | 2.9 | 0.9 | 344 |
| PACM-8/PIDA (60/40) | 8.9 | 10 | 3.1 | 1.0 | 357 |
| PACM-8/PIDA (50/50) | — | — | — | Tough | — |
| PACM-8/PIDA (25/75) | — | — | — | Tough | — |
| $PACM_{(29)}$-8/PIDA (75/25) | 9.6 | 10 | 2.9 | 1.0 | 312 |
| $PACM_{(69)}$-8/PIDA (75/25) | 11.8 | 31 | 3.0 | 1.5 | 331 |
| PACM-9/PIDA (75/25) | 8.9 | 16 | 3.0 | 1.0 | 275 |
| PACM-9/PIDA (70/30) | 8.0 | 10 | 2.8 | 0.6 | 307 |
| PACM-9/PIDA (60/40) | 5.6 | 6 | 2.9 | 0.6 | 333 |
| PACM-12/PIDA (75/25) | 9.4 | 28 | 2.4 | 1.2 | 280 |
| PACM-12/PIDA (70/30) | 9.9 | 32 | 2.5 | 1.6 | 299 |
| PACM-12/PIDA (60/40) | 11.1 | 18 | 2.6 | 1.4 | 313 |
| PACM-6/9/PIDA (40/40/20) | 11.2 | 18 | 3.0 | 1.3 | 336 |
| $PACP_{(64)}$-8/PIDA (75/25) | 11.4 | 17 | 3.2 | 0.9 | 360 |
| PACM-PIDA | — | — | — | Brittle | — |
| PACM-8 | 10.6 | 18 | 2.7 | 2.9 | 286 |

(a) ASTM D 638-68
(b) ASTM D 790-66
(c) ASTM D 256-56
(d) ASTM D 648-56

All of the polyamides described in Tables I and II except PACM-8 were amorphous, optically clear polymers within the scope of this invention, the best properties being exhibited by the copolyamides, in which at least two dicarboxylic acids were employed as monomers. The tables show that polymers with a good balance of properties were obtained when suberic, azelaic, or dodecanedioic acid was employed as a dicarboxylic acid monomer used with the PIDA in various proportions prepared by incorporating glass fibers (as ¼-inch chopped strands), titanium dioxide, or wollastonite, were evaluated. The unfilled polyamide specimens the nomenclature for which is as described in Example I, were prepared by the general procedure given in Example I. Properties of the unfilled and filled polyamides are shown in Table III, these properties being determined as described in Example I. The mechanical properties were determined on injection molded samples.

TABLE III

| Run No. | Inherent Viscosity of Unfilled Polyamide | Filler Weight % (a) | Tensile Strength, psi × 10⁻³ | Elongation % | Flexural Modulus psi × 10⁻⁵ | Izod Impact Strength ft.-lb./in.notch | Heat Deflection Temperature 264 psi. °F |
|---|---|---|---|---|---|---|---|
| 1 | 0.51 | None | 6.4 | 3 | 3.1 | 0.3 | 309 |
| 2 | 0.51 | Glass fibers, 33 | 14.7 | 3 | 11.7 | 1.6 | 348 |
| 3 | 0.81 | None | 11.5 | 73 | 3.0 | 1.5 | 318 |
| 4 | 0.81 | Glass fibers, 30 | 19.4 | 4 | 9.8 | 1.5 | 347 |
| 5 | 0.66 | None | 11.1 | 33 | 3.0 | 1.3 | 311 |
| 6 | 0.66 | Titanium dioxide, 5 | 6.5 | 4 | 3.2 | 0.6 | 304 |
| 7 | 0.66 | Wollastonite, 50 | 10.0 | 3 | 7.8 | 0.6 | 331 |

(a) Based on total weight of polymer and fillers.

As shown in Table III, incorporation of glass fibers, titanium dioxide, or wollastonite in a PACM-8/PIDA (75/25) polyamide resulted in a filled polymer having good mechanical properties which in some instances were better than those of the unfilled polymer used as a control. For example, the use of glass fibers markedly increased the tensile strength, flexural modulus, and heat deflection temperature of both the polyamide of low inherent viscosity and the preferred polyamide of higher inherent viscosity. The use of titanium dioxide provided a means for preparing white, opaque objects having acceptable mechanical properties, and the wollastonite served to increase the flexural modulus and heat deflection temperature.

The amorphous character of the polymers in the preceding examples was determined by differential thermal analysis. There is a possibility that a small degree of crystallinity not detectable by the method employed might be observed by some other method. Accordingly, the polymers of the invention are characterized as being substantially amorphous.

EXAMPLE III

A polyamide (PACM-PIDA) was prepared by the method of Example I from bis(4-aminocyclohexyl)methane (PACM) and 1,1,3-trimethyl-5-carboxy-3-(p-carboxyphenyl)indane (PIDA) and subsequently evaluated as a hot melt adhesive. The polyamide had an inherent viscosity of 0.33 [see footnote (a) in Table I] and a polymer melt temperature of 315°C [see footnote (b) in Table I].

The polyamide was applied in powder form to pre-cleaned aluminum coupons (1.0 in. × 4.0 in. × 0.064 in.), bonded at 350°C/5 tons ram force (120 psi)/30 mins. and tested. The results are listed below.

| Specimen No. | Film Thickness, mils | Adhesive[a] Lap Shear Strength, psi |
|---|---|---|
| 1 | 3 | 820 |
| 2 | 1 | 710 |
| 3 | 2 | 610 |
| 4 | 2 | 590 |
|   | Average: | 683 |

[a]ASTM D 1002-53T

I claim:

1. An amorphous, optically clear solid polyamide consisting essentially of the polymeric condensation product of
   a. at least one bis(4-aminocyclohexyl)methane or a methyl derivative thereof of the formula

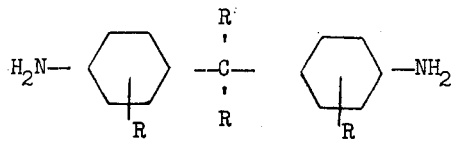

wherein each R is hydrogen or a methyl radical, and
   b. at least one phenylindanedicarboxylic acid or an alkyl derivative thereof of the formula

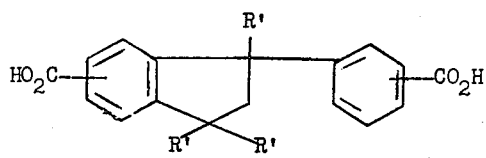

wherein each R' is hydrogen or an alkyl radical having 1–3 carbon atoms.

2. The polyamide of claim 1 wherein (a) is bis(4-aminocyclohexyl)methane, and (b) is 1,1,3-trimethyl-5-carboxy-3-(p-carboxyphenyl)indane.

3. A polyamide according to claim 1 which contains a filler therein as a reinforcement element.

4. A film formed from a polyamide according to claim 1.

5. A fiber composed of a polyamide according to claim 1.

6. A solution of a polyamide according to claim 1 in a solvent therefor.